United States Patent [19]

Matsui

[11] Patent Number: 5,033,855
[45] Date of Patent: Jul. 23, 1991

[54] FIZEAU INTERFERENCE MEASURING METHOD AND APPARATUS THEREFOR

[75] Inventor: Yoshiya Matsui, Yokohama, Japan

[73] Assignee: Canon Kabushiki Kaisha, Tokyo, Japan

[21] Appl. No.: 588,479

[22] Filed: Sep. 27, 1990

Related U.S. Application Data

[63] Continuation of Ser. No. 327,095, Mar. 22, 1989, abandoned.

[30] Foreign Application Priority Data

Mar. 25, 1988 [JP] Japan ................................. 63-71111

[51] Int. Cl.$^5$ .............................................. G01B 9/02
[52] U.S. Cl. ...................................... 356/359; 356/360
[58] Field of Search ..................... 356/357, 359, 360

[56] References Cited

U.S. PATENT DOCUMENTS 3,998,553 12/1976 Hunter et al. ....................... 356/359

OTHER PUBLICATIONS

Moore et al., "Direct Measurement of Phase in a Spherical-Wave Fizeau Interferometer", *Applied Optics*, vol. 19, No. 13, pp. 2196–2200, Jul. 1980.

*Primary Examiner*—Davis L. Willis
*Assistant Examiner*—Matthew W. Koren
*Attorney, Agent, or Firm*—Fitzpatrick, Cella, Harper & Scinto

[57] ABSTRACT

A measuring method and apparatus for measuring the shape of an optical surface using Fizeau interference is disclosed. The states of three surfaces are determined by measuring Fizeau fringes between all possible pairs of said surfaces. In at least one of these measurements means for reversing the coordinate axis in the beam is provided.

20 Claims, 3 Drawing Sheets

FIG. 6 ard FIZEAU INTERFERENCE MEASURING METHOD AND APPARATUS THEREFOR

This application is a continuation of application Ser. No. 327,095 filed Mar. 22, 1989, now abandoned.

BACKGROUND OF THE INVENTION

1. Field of the Invention

The present invention relates to a Fizeau interference measuring method and an apparatus therefor, used for measuring a surface shape or the like and, more particularly, a Fizeau interference measuring method and an apparatus therefor, wherein a spherical surface is measured by utilizing interference to test sphericity or the like of an optical spherical surface. In particular, the present invention relates to a Fizeau interference measuring method and an apparatus therefor, wherein a system error of the measuring apparatus can be eliminated so that a surface can be two-dimensionally measured with high precision.

2. Related Background Art

Strong demand has arisen for high-precision optical elements such as a high-resolution lens for printing semiconductor ICs and an apparatus capable of measuring an optical surface at, e.g., 1/10 or less of a wavelength. Various interferometers employing the principle of interference are commercially available as apparatuses for measuring optical surfaces. In particular, various interferometers capable of performing quantitative measurements with high precision are developed and available along with widespread use of lasers having good coherency and developments of electronics.

A difference between two surface shapes is read in each measurement by a conventional interferometer. For this reason, when one of the surfaces is an ideal surface, no problems are presented. Otherwise, several measurements under different conditions must be performed, and measurement results must be analyzed to obtain individual surface shape errors.

For example, a Fizeau interferometer is available as an interferometer for measuring a shape error of a spherical surface.

Figure 1A:
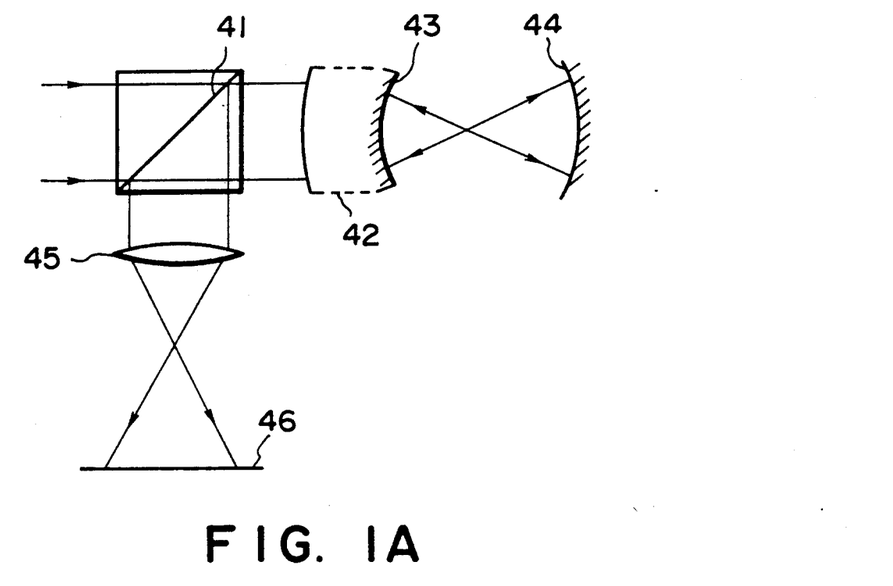
FIG. 1A is a schematic view showing an arrangement of a conventional Fizeau interferometer.

FIG. 1A is a schematic diagram showing an optical arrangement of a main part of a Fizeau interferometer. In the Fizeau interferometer shown in FIG. 1, an end surface 43 of a focusing lens 42 serves as a concave spherical surface concentric with a focal point of a laser beam converted into a spherical shape by the lens 42. The end surface 43 therefore serves as a reference spherical surface.

A laser beam which passes through a beam splitter 41 from the left side and incident in the form of a plane wave is converted by the focusing lens 4 into a beam in the form of a spherical wave which is focused to one point. Part of the beam having the spherical wave is reflected by the reference spherical surface 43 formed at the end position of the focusing lens 42 and is converted again into a beam of a plane wave by the focusing lens 42. The beam of the plane wave is reflected by the beam splitter 41, and the reflected beam is incident on an observation optical system 45.

The remaining laser beam which is kept converted in the form of the spherical wave and focused to one point after passing through the focusing lens 42 is reflected by a spherical surface 44 (a concave surface to be measured in FIG. 1) having the center of radius near the focal point. This reflected beam of the spherical wave is incident on the observation optical system 45 along the same optical path as the beam of the plane wave, thereby forming a two-dimensional interference fringe pattern on a detector surface 46.

Figure 1B:
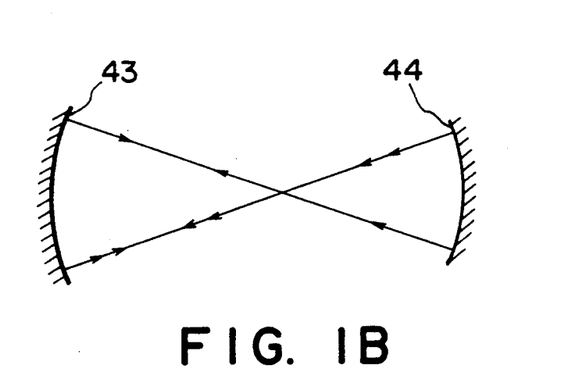
FIGS. 1B and 1C are views showing optical arrangements of the Fizeau interferometer shown in FIG. 1.
Figure 1C:
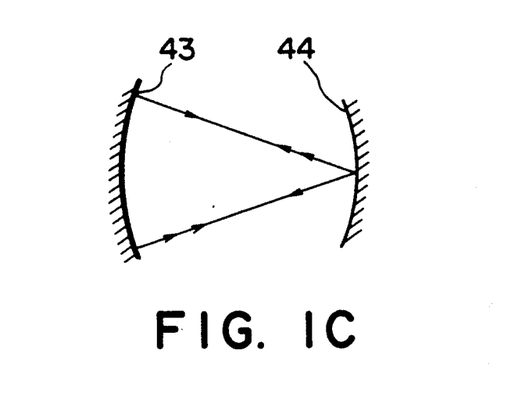

Measurement values based on the interference fringe pattern include a shape error from an ideal spherical surface as the reference spherical surface 43 and a shape error from an ideal spherical surface of the spherical surface 44. It is impossible to separate these errors by one measurement. For example, as shown in FIG. 1B, the spherical surface 44 is vertically reversed, and the same measurement as described above is performed. In addition, as shown in FIG. 1C, the positions of these two spherical surfaces are then changed and the same measurement as described above is performed. The three measurement results are analyzed to separate and extract the shape error of the spherical surface 44.

Figure 2A:
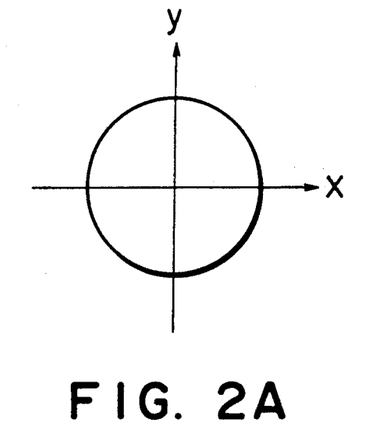
FIGS. 2A and 2B are views showing coordinate systems.
Figure 2B:
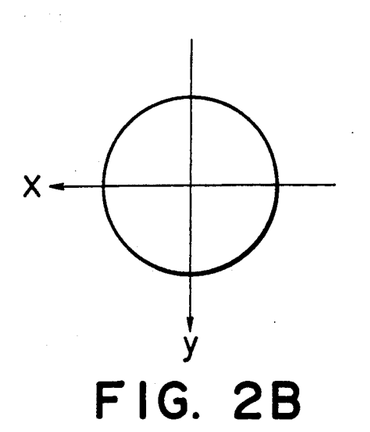
Figure 3:
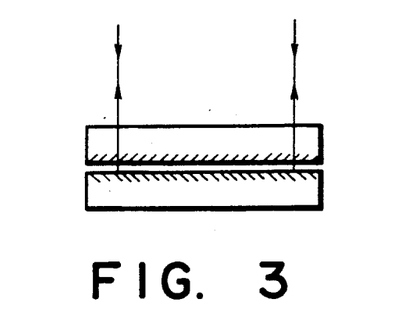
FIG. 3 is a view for explaining a conventional measurement for flatness of a surface.

FIGS. 2A and 2B are views showing a conventional method of plotting coordinates of the measuring light wavefront, the reference spherical surface, and the spherical surface to be measured, all of which are two-dimensionally plotted.

Referring to FIGS. 2A and 2B, the coordinates of the measuring light wavefront and the reference spherical surface are represented by positions of the reference spherical surface 43 when viewed from the spherical surface 44 to be measured (FIG. 1), as shown in FIG. 2A. However, the coordinates of the spherical surface 44 to be measured are plotted such that the vertical direction of the spherical surface is set to be a specific direction and this spherical surface is viewed from the front, as shown in FIG. 2A. Therefore, when the vertical direction of the spherical surface is reversed upside down, the resultant coordinates are given, as shown in FIG. 2B.

According to the conventional method, the first two of the three measurements are performed under the condition given in FIG. 1B. More specifically, the first measurement is performed such that the vertical direction of the spherical surface 44 is reversed upside down, as shown in FIG. 2B, and the second measurement is performed such that the vertical direction is reversed again to restore the normal state, as shown in FIG. 2A. Measurement values of optical path differences in these two measurements are given as $$w_1(x,y) = w_R(x,y) + w_S(-x,y) \quad \text{(a)}$$

$$w_2(x,y) = w_R(x,y) + w_S(x,-y) \quad \text{(b)}$$

where x and y are incident positions of object optical paths on the spherical surface 44. The right-hand term $w_R(x,y)$ in each of equations (a) and (b) represents a contribution amount of the corresponding optical path difference due to the shape error of the reference spherical surface 43, and the right-hand term $w_S(-x,y)$ or $w_S(x,-y)$ represents a contribution amount corresponding optical path difference due to the shape error of the spherical surface 44 itself. In the measurements by the Fizeau interferometer under the conditions shown in FIGS. 1A and 1B, even if a laser beam of a spherical wave incident on the reference spherical surface 43 slightly includes aberration by an optical system for receiving this laser beam, the aberration can be canceled since it acts on both the wavefront reflected by the reference spherical surface 43 and the wavefront reflected by the spherical surface 44 with equal magnitudes. Therefore, the influence of aberration is negligible, which has been theoretically proved. This is why the right-hand sides of equations (a) and (b) consist of only shape errors of the reference spherical surface 43 and the spherical surface 44. This is a great advantage in the Fizeau interferometer as compared with other interferometers such as a Twyman interferometer. It is impossible to completely extract the contribution amount caused by the shape error of the spherical surface 44 by only equations (a) and (b). Therefore, the additional measurement is performed while the spherical surface 44 is located at a focal point of the measuring light beam.

In this case, the interference fringe pattern is not associated with the shape of the spherical surface 44 but only with the shape of the reference spherical surface 43. If aberration is slightly included in the laser beam of the spherical wave incident on the reference spherical surface 43, symmetrical components cancel each other during interference. However, asymmetrical components are doubled to adversely affect the interference fringe pattern. This can be empirically confirmed and can be theoretically explained. If the measurement value in this case is defined as $w_3(x,y)$, the following equation can be established:

$$w_3(x,y) = w_0(x,y) + W_R(x,y) \tag{c}$$

The first term $w_0(x,y)$ of the right-hand side represents a contribution amount by the asymmetrical components of aberration.

Since the term $w_0(x,y)$ represents the asymmetrical aberrational component, $w_0(x,y)$ and $w_0(-x,-y)$ which is obtained by rotating $w_0(x,y)$ through 180° about the origin satisfy the following relation:

$$w_0(-x,-y) = -w_0(x,y) \tag{d}$$

In order to obtain the contribution amount $w_S(-x,y)$ caused by the shape error of the spherical surface 44 on the basis of the three measurement values represented by equations (a), (b), and (c), $w_2(-x,-y)$ and $w_3(-x,-y)$ obtained by rotating the coordinates of the measurement values $w_2(x,y)$ and $w_3(x,y)$ shown in equations (b) and (c) through 180°, respectively, must be obtained. As a result, the contribution amount $w_S(-x,y)$ of the shape error of the spherical surface 44 is obtained by using the measurement values $w_1(x,y)$ and $w_3(x,y)$ shown in equations (a) and (c) and the obtained $w_2(-x,-y)$ and $w_3(-x,-y)$ as follows:

$$w_S(-x,y) = \tfrac{1}{2}\{w_1(x,y) + w_2(-x,-y)\} - \tfrac{1}{2}\{w_3(x,y) + w_3(-x,-y)\} \tag{e}$$

In general, in order to measure sphericity of a spherical surface with high precision of 1/10 or less of the wavelength by an interferometer, three interference measurements in different conditions must be inevitably performed by any interferometer to extract the shape error of the object spherical surface since an ideal spherical surface serving as a comparison reference does not exist. In this case, when aberration of the optical system constituting the interferometer is mixed in the interference fringe pattern, it adversely affects the interference fringe pattern equally or greater than the shape error of the object spherical surface. It is, therefore, apparent that reliability of the measurement result is greatly degraded.

Of the three measurements performed by the conventional Fizeau interferometer, the first two measurements are performed under the condition shown in FIG. 1B. This condition does not cause aberration of the optical system to adversely affect the interference fringe pattern. However, since the condition in FIG. 1C is employed in the third measurement, the asymmetrical aberrational components of the optical system are doubled and mixed in the interference fringe pattern. As a result, the measurement reliability is degraded as a whole.

In order to enhance the advantage of the measurement by the Fizeau interferometer, it is preferable to perform all three measurements under the condition shown in FIG. 1B to separate and extract the shape error of the object spherical surface. In order to achieve this, a conventional three-surface alignment method (e.g., D. Malacara, Optical Shop Testing (John Wiley & Sons, 1978, PP. 41-42) known as a method of testing optical planes with high precision can be applied to measurements of a spherical surface.

The three-surface alignment method is practiced as follows. Three optical surfaces A, B, and C are combined into pairs of surfaces A and B, A and C, and B and C. Each pair of surfaces are located to oppose each other to cause optical interference, and shape errors of these surfaces A, B, and C are separated and extracted by three measurements. If coordinates of the three optical surfaces are plotted, as shown in FIG. 2A, measurement values $w_1(x,y)$, $w_2(x,y)$, and $w_3(x,y)$ of the optical path differences obtained by the three measurements are given as follows:

$$w_1(x,y) = w_A(x,y) + w_B(-x,y) \tag{1}$$

$$w_2(x,y) = w_A(x,y) + w_C(-x,y) \tag{2}$$

$$w_3(x,y) = w_B(x,y) + w_C(-x,y) \tag{3}$$

The sign of the x-coordinate of each second term is opposite to that of each first term in the right-hand side because the y-axis is reversed so that the surface represented by the second term opposes that represented by the first term. The term $w_B(-x,y)$ of the right-hand side in equation (1) is not generally equal to the term $w_B(x,y)$ of the right-hand side. In order to separate and extract the shape errors of the individual surfaces by using the above linear equations with three unknowns, $x=0$ must be established, i.e., only y-coordinates on the y-axis are considered since the sign of the x-coordinate does not then pose any problem.

In order to obtain shape errors of all the surfaces, the surfaces are slightly rotated, and similar three measurements must be repeated. This repetition is the problem of the three-surface alignment method.

In the measurement of sphericity by the Fizeau interferometer, the same measurements as in the three-surface alignment method of the optical surfaces can be performed for the three spherical surfaces A, B, and C. In this case, the spherical surfaces A and B are concave reference spherical surfaces integral with the focusing lens, and the spherical surface C is any spherical surface. These spherical surfaces A to C are arranged, as shown in FIGS. 1A and 1B. In the three measurements, the reference surface 43 and the surface 44 to be measured are A and B, A and C, and B and C, respectively.

The coordinates of the reference surface 43 when viewed from the front are defined as in FIG. 2A, and the coordinates of the surface 44 are defined as in FIG. 2B. The optical path differences obtained by the three measurements have the same relationships with those defined by equations (1), (2), and (3).

Therefore, the resultant shape errors are one-dimensional, i.e., along the y-axis of each surface in the three measurements. Therefore, the above attempt is not free from the drawback of the three-surface alignment method.

SUMMARY OF THE INVENTION

The present invention has been made in consideration of the conventional problems described above, and has as its first object to provide a Fizeau interference measuring method and an apparatus therefor, wherein two-dimensional shape errors can be easily tested with high precision.

In order to achieve the above object of the present invention, when a Fizeau interferometer and the principle of three-surface alignment method are utilized to test a spherical surface condition such as sphericity of an optical surface, a plane mirror is arranged in part of the interferometer to reverse coordinates within a light wavefront, and at least one of the three measurements is performed through the plane mirror, thereby measuring the two-dimensional surface state of the entire spherical surface with high precision.

The above and other objects, features, and advantages of the present invention will be apparent from the detailed description of preferred embodiments in conjunction with the accompanying drawings.

DESCRIPTION OF THE PREFERRED EMBODIMENTS

In the following preferred embodiments, as previously described, a movable plane mirror is located near a focal plane of the light beam output from an interfering means, any two of the three object spherical surfaces are selected and arranged to oppose each other so as to obtain a common center of curvature. The light beams from the two spherical surfaces are superposed to interfere with each other. The optical path length measurements for different combinations of two surfaces are repeated three times. In this case, at least one of the three measurements is performed by using a beam deflected laterally by the plane mirror located near the center of curvature. Therefore, the two-dimensional surface condition of the entire spherical surface as an object can be measured.

Figure 4:
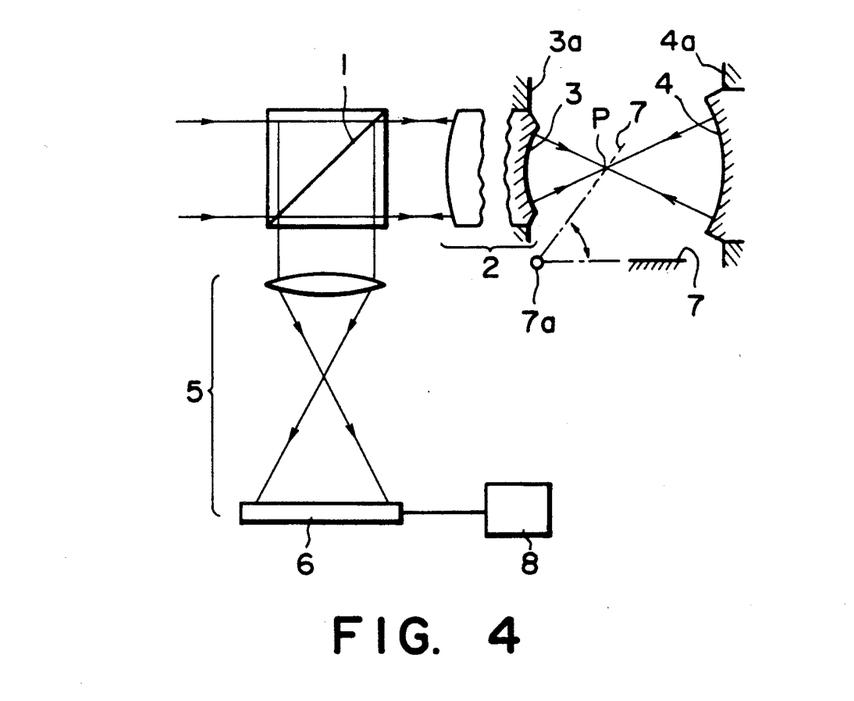
FIG. 4 is a schematic view showing a Fizeau interference measuring apparatus according to a first embodiment of the present invention.

FIG. 4 is a schematic view showing the main part of a Fizeau interferometer according to an embodiment of the present invention. The interferometer includes a beam splitter 1 and a focusing lens 2. A laser beam from the beam splitter 1 is focused at a point P. A reference spherical surface 3 corresponds to the end lens of the focusing lens 2 and has a concave surface concentric with the point P. A spherical surface 4 to be measured is located such that its center of curvature almost coincides with the point P, i.e., the spherical surfaces 3 and 4 have a common center of curvature. The reference spherical surface 3 and the spherical surface 4 to be measured are held by holders 3a and 4b, respectively. The interferometer also includes an observation optical system 5, a detector surface 6 for detecting an interference fringe pattern, and a plane mirror 7. The plane mirror 7 is supported to be pivotal about a point 7a and is pivoted to a position indicated by a dotted line, i.e., the position of the point P by a driving means (not shown). An arithmetic unit 8 calculates surface precision by using an output signal from the detector surface 6.

A laser beam of a plane wave incident through the beam splitter 1 from the left is converted by the focusing lens 2 into a laser beam of a spherical wave focused to one point. Part of the beam of the spherical wave is reflected by the reference spherical surface 3 located at the end of the focusing lens 2 and is converted again into a beam of a plane wave by the focusing lens 2. The beam of the plane wave is reflected by the beam splitter 1, and the reflected beam is incident on the observation optical system 5. The remaining laser beam of the spherical wave focused to one point through the focusing lens 2 is reflected by the spherical surface 4 (concave surface in FIG. 4) which is held by the holder 4a and has the center of curvature near the focal point. The reflected beam is incident on the observation optical system 5 along the same path as the beam of the plane wave, thereby forming a two-dimensional interference fringe pattern on the detector surface 6.

In this embodiment, the beam splitter 1 and the focusing lens 2 constitute part of the interfering means.

Figure 5:
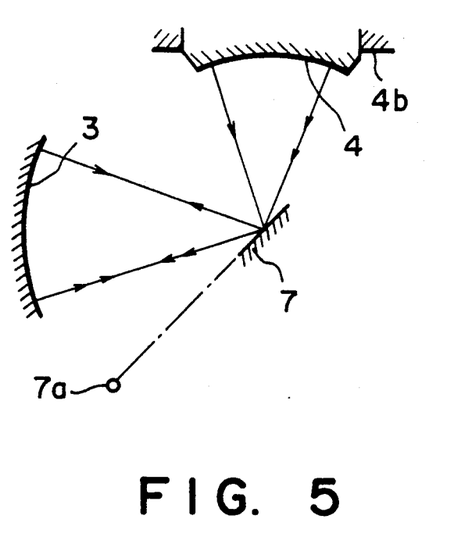
FIG. 5 is a schematic view showing a main part of the apparatus shown in FIG. 4.

In this embodiment, three interference measurements are performed in combinations of spherical surfaces A and B, A and C, and B and C by the Fizeau interferometer, and sphericity of each spherical surface is obtained on the basis of the measurement values. In this case, each of the spherical surfaces A and B included in the above three spherical surfaces is the concave reference surface 3 integral with the focusing lens 2, as shown in FIG. 4. The plane mirror 7 shown in FIG. 4 is pivoted from the position indicated by the solid line to the position indicated by the dotted line. As shown in FIG. 5, the plane mirror 7 is located at or near the position P where the measuring beam is focused at this position by the focusing lens 2 having the reference spherical surface 3. The measuring beam is laterally deflected by the plane mirror 7, and the concave spherical surface 4 is held by the holder 4b so that its center of curvature almost coincides with the focal point of the measuring beam. Under this condition, at least one of the three measurements is performed. In the measurement under the condition shown in FIG. 5, the coordinates within the light wavefront are reversed by the plane mirror from the state shown in FIG. 2A.

In this case, the deflection angle by the plane mirror 7 can be arbitrarily set within the range in which the measuring beam after reflection does not interfere with the measuring beam before reflection. The spherical surface 4 is arranged upside down with respect to the reference spherical surface 3.

Under these conditions, assume that a measurement value obtained by setting the spherical surface A as the spherical surface 3 and the spherical surface B as the spherical surface 4 is defined as $w_1(x,y)$, that a measurement value obtained by setting the spherical surface A as the spherical surface 3 and the spherical surface C as the spherical surface 4 is defined as $w_2(x,y)$, that a measurement value obtained by setting the spherical surface B as the spherical surface 3 and the spherical surface C as the spherical surface 4 is defined as $w_3(x,y)$. Under these assumptions, the following equations are established:

$$w_1(x,y) = w_A(x,y) + w_B(x,y) \quad (4)$$

$$w_2(x,y) = w_A(x,y) + w_C(x,y) \quad (5)$$

$$w_3(x,y) = w_B(x,y) + w_C(x,y) \quad (6)$$

If all the three measurements are performed in the optical arrangement in FIG. 5, amounts $w_A(x,y)$, $w_B(x,y)$, and $w_C(x,y)$ representing the shape errors of the respective spherical surfaces are easily calculated using the measurement values $w_1(x,y)$, $w_2(x,y)$, and $w_3(x,y)$ as follows:

$$w_A(x,y) = \tfrac{1}{2}\{w_1(w,y) + w_2(x,y) - w_3(x,y)\} \quad (7)$$

$$w_B(x,y) = \tfrac{1}{2}\{w_1(x,y) - w_2(x,y) + w_3(x,y)\} \quad (8)$$

$$w_C(x,y) = \tfrac{1}{2}\{-w_1(x,y) + w_2(x,y) + w_3(x,y)\} \quad (9)$$

In the above embodiments, any two of the three spherical surfaces A, B, and C are selected, and the three measurements are performed in different combinations of the spherical surfaces. However, at least one measurement must be performed in the state of FIG. 5, while two other measurements may be performed by the optical arrangement not using the plane mirror shown in FIG. 4.

If the measurement values in the second and third measurements are defined as $w_2'(w,y)$ and $w_3'(x,y)$, the following equations are established in place of equations (5) and (6):

$$w_2'(x,y) = w_A(x,y) + w_C(-x,y) \quad (5)'$$

$$w_3'(x,y) = w_B(x,y) + w_C(-x,y) \quad (6)'$$

In this case, amounts representing the spherical errors of the respective spherical surfaces are obtained in place of equations (7), (8), and (9) as follows:

$$w_A(x,y) = \tfrac{1}{2}\{w_1(x,y) + w_2'(x,y) - w_3'(x,y)\} \quad (7)'$$

$$w_B(x,y) = \tfrac{1}{2}\{w_1(x,y) - w_2'(x,y) + w_3'(x,y)\} \quad (8)'$$

$$w_C(-x,y) = \tfrac{1}{2}\{-w_1(x,y) + w_2'(x,y) + w_3'(x,y)\} \quad (9)'$$

Figure 6:
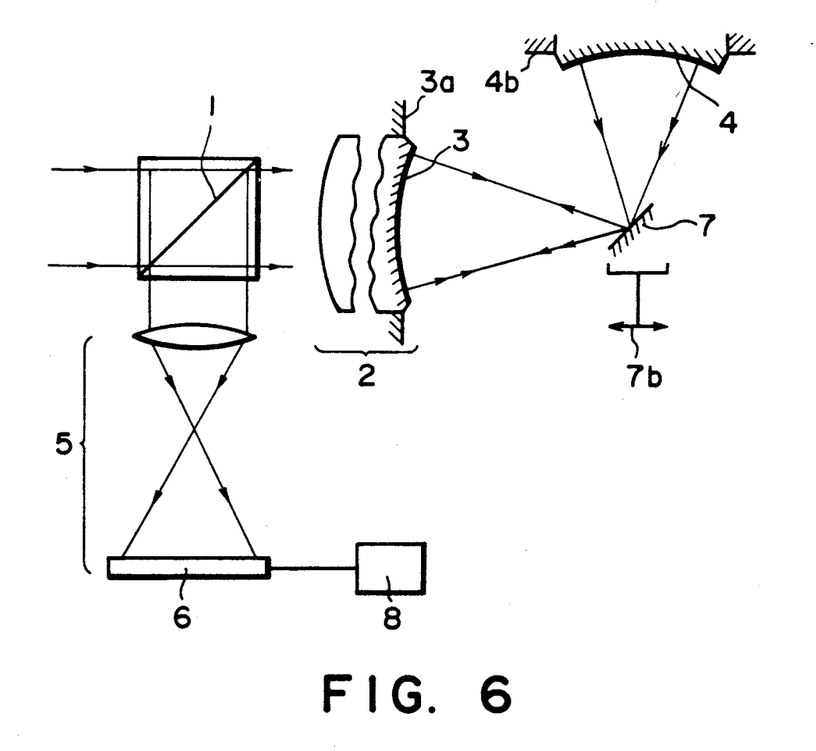
FIG. 6 is a schematic view showing a Fizeau interference measuring apparatus according to a second embodiment of the present invention.

FIG. 6 is a schematic view showing the main part according to another embodiment of the present invention. This embodiment exemplifies a case wherein all three measurements are performed through a plane mirror 7 located near the center of curvature of the object spherical surface. The same reference numerals as in FIG. 4 denote the same parts in FIG. 6.

Referring to FIG. 6, the plane mirror 7 is movable in a direction indicated by, e.g., an arrow 7b to cope with changes in focal points of beams output from a reference spherical surface 3 in accordance with changes in radii of curvature of the object spherical surfaces.

The principle of measurement and the measuring method of this embodiment are basically the same as those of the embodiment shown in FIG. 4. The shape errors of the respective spherical surfaces are obtained by equations (7), (8), and (9).

According to the above embodiments of the present invention, at least one measurement is performed through the plane mirror in the Fizeau interferometer to simultaneously obtain the two-dimensional shape errors of the all spherical surfaces. When an object to be measured is a spherical surface, there is a position where the measuring beam is focused at one point. This point is utilized to laterally reflect the measuring beam by the plane mirror 7 located at the focal point. The beams from the two spherical surfaces are caused to interfere with each other through the plane mirror, and the sign of the x-coordinate can be changed to be positive without mixing unnecessary aberrational components. Therefore, the principle of three-surface alignment method can be applied to the entire spherical surface.

According to each embodiment of the present invention, aberrational components of the optical system and other unnecessary components are not included in the measurement values $w_1(x,y)$, $w_2(x,y)$, and $w_3(x,y)$ or the measurement values $w_1(x,y)$, $w_2'(x,y)$, and $w_3'(x,y)$. Therefore, highly reliable measurements of sphericity can be performed with high precision.

In each embodiment described above, if two spherical surfaces which serve as the reference surfaces are concave surface, the remaining surface may be a convex surface. In this case, the arrangement shown in FIG. 5 is utilized only when the two concave surfaces oppose each other. Other two measurements are performed in the arrangement of FIG. 4 such that the radius of curvature of the concave surface is set to be equal to that of the convex surface.

According to the present invention, there is provided an interference measuring apparatus wherein when a Fizeau interferometer and the principle of three-surface alignment are used to measure a surface state such as sphericity of an optical surface, at least one of the three measurements is performed by using a movable plane mirror located in part of the interferometer, thereby eliminating system errors and measuring the two-dimensional surface state of the entire spherical surface with high precision.

What is claimed is:

1. A Fizeau interference measuring method of detecting surface states of three surfaces, comprising:
the first step of selecting two of the three surfaces, locating one of the selected surfaces as a first surface at a predetermined position, locating the other surface as a second surface at a light beam incident position of a light beam emitted from said first surface when the light beam is entered to the first surface, the second surface opposing the first surface;

the second step of entering a light beam to the first surface, reflecting the light beam by the second surface and entering the reflected light beam to the first surface again so as to measure an interference state of the light beam;

the third step of locating two surfaces as first and second surfaces constituting a combination different from that constituted by the two surfaces selected in the first step in the same manner as in the first step;

the fourth step of entering a light beam to the first surface selected in the third step, reflecting the beam by the second surface selected in the third step and entering the reflected beam to the first surface selected in the third step again so as to measure an interference state of the light beam;

the fifth step of locating two surfaces as first and second surfaces constituting a combination different from that constituted by the two surfaces selected in the first and third steps in the same manner as in the first step;

the sixth step of entering a light beam to the first surface selected in the fifth step, reflecting the beam by the second surface selected in the fifth step, and entering the reflected beam to the first surface selected in the fifth step again so as to measure an interference state of the light beam; and the seventh step of detecting the surface states of the three surfaces on the basis of measurement results in the second, fourth, and sixth steps, wherein at least one of the first, third, and fifth steps includes the step of locating means for reversing a coordinate axis within a beam wavefront between the first and second surfaces.

2. A method according to claim 1, wherein the three surfaces are spherical surfaces, respectively.

3. A method according to claim 2, wherein the coordinate axis reversing means comprises a plane mirror.

4. A method according to claim 3, wherein each of the first, third, and fifth steps comprises the step of locating the plane mirror between the first and second surfaces.

5. A Fizeau interference measuring apparatus for detecting surface states of three surfaces, comprising:

first holding means for holding one of the three surfaces at a predetermined position;

second holding means, opposing the surface held by said first holding means, for holding one of the three surfaces at a light beam incident position of a light beam emitted from said surface when the light beam is entered to the surface held by said first holding means;

beam entering means for entering a light beam on the surface held by said first holding means;

interference state measuring means for causing the surface held by said second holding means to reflect the beam emitted from the surface which receives the beam from said light beam entering means and entering the reflected light beam on the surface held by said first holding means again so as to measure an interference state of the light beam;

means for causing said first and second holding means to set two surfaces of all combinations each constituted by two of the three surfaces to oppose each other, and for obtaining the surface states of the three surfaces on the basis of the interference state obtained by said interference state measuring means; and means for reversing a coordinate axis within a beam wavefront, said coordinate axis reversing means being located between the surface held by said first holding means and the surface held by said second holding means when the two surfaces of at least one of all the combinations oppose each other.

6. An apparatus according to claim 5, wherein the three surfaces are spherical surfaces, respectively.

7. An apparatus according to claim 6, wherein said coordinate axis reversing means comprises a plane mirror.

8. An apparatus according to claim 7, further including a plane mirror moving mechanism for locating said plane mirror between the spherical surface held by said first holding means and the spherical surface held by said second holding means when the two surfaces of at least one of all the combinations oppose each other.

9. An apparatus according to claim 7, wherein said plane mirror is always located between the spherical surface held by said first holding means and the spherical surface held by said second holding means.

10. A Fizeau interference measuring method for detecting surface errors of three surfaces, comprising:

a first step in which two of the three surfaces are selected, one of them being located as a first surface at a predetermined position, and the other being located as a second surface opposite to the first surface at a position that will be hit by a light beam coming through the first surface;

a second step of measuring an interference state between the two surfaces as described in the first step, in which a light beam entering the first surface is divided into two parts, the first part being reflected back at the first surface, and the second part, after it enters the first surface, being reflected at the second surface and entering back again through the first surface so as to make an interference pattern together with the first part of the light beam;

a third step of selecting two surfaces, the combination of which being different from that of the first step, and locating said surfaces, as first and second surfaces in the same manner as described in the first step;

a fourth step of measuring an interference state with the arrangement as described in the third step and in the same manner as described in the second step;

a fifth step of selecting two surfaces, the combination of which being different from that of each of the first and third steps, and locating said surfaces as first and second surfaces in the same manner as described in the first step;

a sixth step of measuring an interference state with the arrangement as described in the fifth step and in the same manner as described in the second step;

a seventh step of detecting surface errors of the three surfaces based on the results of measurements obtained in the second, fourth and sixth steps;

wherein among the three arrangements described by the first, third and fifth steps, at least one of said arrangements further having a means located between the first and second surfaces, in order to reverse the direction of a coordinate axis associated with a wavefront of a light beam.

11. A Fizeau interference measuring apparatus for detecting surface errors of three surfaces, comprising:

first holding means adapted to hold one of the three surfaces at a predetermined position;

second holding means adapted to hold one of the three surfaces, which is opposite to a surface held by the first holding means, at a position that will be hit by a light beam which enters and comes through the surface held the first holding means;

means for entering a light beam to a surface held by the first holding means;

means for measuring an interfering state between two light beams, one of which being a beam reflected at a surface held by the first holding means and the other being a beam which enters through said surface and enters back again after being reflected by a surface held by the second holding means; and means for reversing a wavefront coordinate axis of a light beam, which is set between two surfaces that are opposite to each other and held by said first and second holding means respectively, in at least one of the possible arrangements of two surfaces among said three surfaces.

12. A Fizeau interference measuring method for detecting surface states of three surfaces, comprising:

a first step of selecting two of the three surfaces, locating one of the selected surfaces as a first surface at a predetermined position, locating the other surface as a second surface at a light beam incident position of a light beam emitted from said first surface, the second surface opposing the first surface;

a second step of entering a light beam to the first surface, reflecting the light beam by the second surface and entering the reflected light beam to the first surface again so as to measure an interference state of the light beam;

a third step of selecting two surfaces as first and second surfaces constituting a combination different from that constituted by the two surfaces selected in the first step and locating said surfaces in the same manner as in the first step;

a fourth step of entering a light beam to the first surface selected in the third step, reflecting the beam by the second surface selected in the third step and entering the reflected beam to the first surface selected in the third step again so as to measure an interference state of the light beam;

a fifth step of selecting two surfaces as first and second surfaces constituting a combination different from that constituted by the two surfaces selected in either of the first and third steps, and locating said surfaces in the same manner as in the first step;

a sixth step of entering a light beam to the first surface selected in the fifth step, reflecting the beam by the second surface selected in the fifth step, and entering the reflected beam to the first surface selected in the fifth step again so as to measure an interference state of the light beam; and a seventh step of detecting the surface states of the three surfaces on the basis of the measurement results from the second, fourth, and sixth steps, wherein at least one of the first, third, and fifth steps includes the additional step of locating a means between the first and second surfaces for reversing a direction of one of the coordinate axes set within a light beam wavefront.

13. A method according to claim 12, wherein the three surfaces each are spherical surfaces, respectively.

14. A method according to claim 13, wherein the coordinate axis reversing means comprises a plane mirror.

15. A method according to claim 14, wherein each of the first, third and fifth steps comprises the additional step of locating a plane mirror between the first and second surfaces.

16. A Fizeau interference measuring apparatus for detecting surface states comprising:

first holding means for holding one surface at a predetermined position;

second holding means, opposing the surface held by said first holding means, for holding another surface at a light beam incident position of a light beam emitted from said surface held by said first holding means when the light beam is entered to the surface held by said first holding means;

light beam entering means for entering a light beam on the surface held by said first holding means;

interference state measuring means for causing the surface held by said second holding means to reflect a beam emitted from the surface held by said first holding means when it receives the beam from said light beam entering means and to enter the reflected light beam to the surface held by said first holding means again, so as to measure an interference state of the light beam; and means for reversing a coordinate axis within a light beam wavefront, said coordinate axis reversing means being located between a surface held by said first holding means and a surface held by said second holding means when the two surfaces are opposite to each other.

17. An apparatus according to claim 16, wherein said means for reversing a coordinate axis is a light-reflective means.

18. An apparatus according to claim 17, wherein said coordinate axis reversing means comprises a plane mirror.

19. An apparatus according to claim 18, further including a plane mirror moving mechanism for locating said plane mirror between a spherical surface held by said first holding means and a spherical surface held by said second holding means when the two surfaces are opposite to each other.

20. An apparatus according to claim 18, wherein said plane mirror is always located between the spherical surface held by said first holding means and the spherical surface held by second holding means.

* * * * *

UNITED STATES PATENT AND TRADEMARK OFFICE
CERTIFICATE OF CORRECTION

PATENT NO. : 5,033,855
DATED : July 23, 1991
INVENTOR(S) : YOSHIYA MATSUI It is certified that error appears in the above-identified patent and that said Letters Patent is hereby corrected as shown below:

<u>Column 1</u>

Line 54, "focusing lens 4" should read --focusing lens 42--.

<u>Column 2</u>

Line 14, "changed" should read --changed,--.

Line 58, "amount corre-" should read --amount of a corre- --.

<u>Column 6</u>

Line 15, "holders 3a and 4b," should read --holders 3a and 4a,--.

<u>Column 7</u>

Line 33, "$w_A(x,y)=1/2\{w_1(w,y)+w_2(x,y)-w_3(x,y)\}$ (7)" should read --$w_A(x,y)=1/2\{w_1(x,y)+w_2(x,y)-w_3(x,y)\}$ (7)--.

Line 50, "$w_2'(w,y)$" should read --$w_2'(x,y)$--.

UNITED STATES PATENT AND TRADEMARK OFFICE
CERTIFICATE OF CORRECTION

PATENT NO. : 5,033,855

DATED : July 23, 1991

INVENTOR(S) : YOSHIYA MATSUI

It is certified that error appears in the above-identified patent and that said Letters Patent is hereby corrected as shown below:

<u>Column 8</u>

Line 23, "the all" should read --all the--.

<u>Column 11</u>

Line 7, "held the" should read --held by the--.

<u>Column 12</u>

Line 59, "second holding means" should read --said second holding means--.

Signed and Sealed this

Twenty-third Day of February, 1993

Attest:

STEPHEN G. KUNIN

Attesting Officer

Acting Commissioner of Patents and Trademarks